(12) United States Patent
Mauduit

(10) Patent No.: US 8,407,894 B2
(45) Date of Patent: Apr. 2, 2013

(54) METHOD OF MANUFACTURING PANELS HAVING INTEGRATED HEAT PIPES AND/OR INSERTS MAINTAINED BY TONGUES

(75) Inventor: Daniel Mauduit, Frejus (FR)

(73) Assignee: Thales, Neuilly sur Seine (FR)

( * ) Notice: Subject to any disclaimer, the term of this patent is extended or adjusted under 35 U.S.C. 154(b) by 1169 days.

(21) Appl. No.: 12/161,994

(22) PCT Filed: Jan. 25, 2007

(86) PCT No.: PCT/FR2007/050691
§ 371 (c)(1),
(2), (4) Date: Nov. 19, 2008

(87) PCT Pub. No.: WO2007/085767
PCT Pub. Date: Aug. 2, 2007

(65) Prior Publication Data
US 2009/0218076 A1 Sep. 3, 2009

(30) Foreign Application Priority Data
Jan. 25, 2006 (FR) ...................................... 06 50255

(51) Int. Cl.
*B23P 6/00* (2006.01)
*F28D 15/00* (2006.01)
(52) U.S. Cl. ............................ 29/890.032; 165/104.14
(58) Field of Classification Search .................... 165/47, 165/104.14, 168; 52/220.3, 309.7, 309.16, 52/782.1, 802.11; 29/890.03, 890.032, 890.043, 29/890.046, 527.1, 525.13; 62/507
See application file for complete search history.

(56) References Cited

U.S. PATENT DOCUMENTS

| | | | | | |
|---|---|---|---|---|---|
| 4,880,052 | A | * | 11/1989 | Meyer et al. | 165/104.14 |
| 5,168,921 | A | * | 12/1992 | Meyer, IV | 165/104.14 |
| 5,454,428 | A | * | 10/1995 | Pickard et al. | 165/49 |
| 5,829,516 | A | * | 11/1998 | Lavochkin | 165/80.4 |
| 7,007,504 | B2 | * | 3/2006 | Kang | 62/507 |
| 7,849,598 | B2 | * | 12/2010 | Hsu | 29/890.032 |
| 2008/0047140 | A1 | * | 2/2008 | Hsu | 29/890.03 |

FOREIGN PATENT DOCUMENTS
DE 2027451 A * 12/1971

* cited by examiner

*Primary Examiner* — David Bryant
*Assistant Examiner* — Jacob Cigna
(74) *Attorney, Agent, or Firm* — Lowe Hauptman Ham & Berner, LLP

(57) ABSTRACT

A method of fabrication of panels having built-in heat pipe(s) and/or insert(s) (P), includes providing a bottom plate having tabs, partially straightening the tabs toward the accommodation zones, positioning the heat pipes and/or the inserts in each accommodation zone between the tabs and in contact with the upper face of the bottom plate, terminating the straightening of the tabs, depositing a selected thickness of a first adhesive against side faces of the heat pipes and/or the inserts, positioning separating structures, substantially having a same height as that of the heat pipes and/or the inserts on either side of the side faces of each heat pipe and/or insert and in contact with the upper face of the bottom plate, and placing an upper plate above the heat pipes and/or inserts and the separating structures and in contact therewith.

18 Claims, 2 Drawing Sheets

METHOD OF MANUFACTURING PANELS HAVING INTEGRATED HEAT PIPES AND/OR INSERTS MAINTAINED BY TONGUES

CROSS-REFERENCE TO RELATED APPLICATIONS

The present Application is based on International Application No. PCT/FR2007/050691, filed on Jan. 25, 2007, which in turn corresponds to French Application No. 0650255 filed on Jan. 25, 2006, Each of these applications are hereby incorporated by reference in their entirety into the present application.

FIELD OF THE INVENTION

The invention relates to panels having built-in heat pipe(s) and/or insert(s), and more precisely the methods for fabricating such panels.

BACKGROUND OF THE INVENTION

In the context of the present invention, "panel having built-in heat pipe(s) and/or insert(s) means a panel comprising plates called bottom and upper plates, between which heat pipes and/or inserts are immobilized (for example two or three, or even thirty or forty), separated from one another by separating structures, generally of the honeycomb type. Furthermore, in the context of the present invention, "insert" means a block, for example of aluminum, serving as a fastening point for equipment installed later.

As a person skilled in the art knows, such panels can be fabricated by two methods comprising numerous steps, starting with a flat plate (or baking plate), bottom and upper plates, heat pipe(s) and/or insert(s), pins and separating structures.

The first method consists in first treating the pins to coat them completely with a material for allowing their stripping. The bottom plate must then be placed on the flat plate and then coated with a layer of adhesive. The separating structures must then be positioned in selected places, in order to define accommodation zones for heat pipe(s) or insert(s). The heat pipes and/or inserts must then be positioned in the accommodation zones between the separating structures. Part of the free space between the heat pipes and/or inserts and the separating structures must then be filled with an intumescent adhesive. The upper plate (or an auxiliary plate) must then be placed above the heat pipe and/or inserts and separating structures and in contact therewith, after the lower face of the upper plate is coated with an adhesive layer. The treated pins must then be introduced through the upper plate (or auxiliary plate) so that they are placed in the spaces containing the intumescent glue on either side of the side faces of the heat pipes and/or inserts. The assembly (including the baking plate) must then be passed through a furnace or an autoclave for a selected period, in order to cure the panel. This is followed by stripping. The pins must then be extracted. And finally, the pins must be cleaned.

It may be observed that in case of the use of an auxiliary plate, the latter must then be removed by bonding to a final upper plate called "flying plate" (the use of an auxiliary plate serves to confirm the expansion of the intumescent adhesive without having to take X-ray pictures).

The second method consists in first treating the pins to coat them completely with a material that allows their stripping. The treated pins must then be positioned in places selected on the baking plate, corresponding to the accommodation zones of the heat pipes or inserts on the bottom plate. The bottom plate, previously coated with adhesive, must then be placed on the flat plate so that it is traversed by the pins. The separating structures must then be positioned between the alignments of pins outside the accommodation zones of the heat pipe or insert. The heat pipes or inserts must then be positioned in their accommodation zones between the alignments of pins. The free space between the heat pipes and/or inserts and the separating structures must then be filled with an intumescent adhesive. The upper plate (or an auxiliary plate) must then be placed above the heat pipes and/or inserts and separating structures and in contact therewith, after an optional coating of the lower face of the upper plate with a layer of adhesive. The assembly (including the baking plate) must then be passed through a furnace or autoclave during a selected period, in order to cure the panel. The panel must then be stripped by carefully separating the panel from the pins joined to the baking plate. The pins must lastly be cleaned.

This second method is currently preferred when the tolerance of the positioning of the heat pipes and/or inserts is low (typically above one millimeter). However, it is quickly limited in the case of a large number of heat pipes and/or inserts and a large panel.

Regardless of the method used, the number of steps in the sequence is too large and the extraction of the pins from the panel proves to be difficult, and even sometimes virtually impossible due to the action of the adhesive on the parts of the pins or housings thereof where the protection may be damaged during handling and/or which are poorly protected. It is certainly possible to improve the situation, for example by using taper pins and/or holes comprising a flat, but this increases the cost without necessarily reducing the number of steps in the sequence.

SUMMARY OF THE INVENTION

Since no known method provides full satisfaction, it is the object of the invention to improve the situation by proposing a fabrication method that does not require the use of pins, by preserving the accuracy of positioning of the heat pipes and/or inserts (or even improving it so that it becomes lower than or equal to 1 mm), and by offering the possibility of incorporating a large quantity of heat pipes and/or inserts, typically between 30 and 40, or even more.

For this purpose, it proposes a method for fabricating panel(s) having built-in heat pipe(s) and/or insert(s), consisting in:
a) providing a bottom plate comprising, in selected places on either side of the heat pipe and/or insert accommodation zones, tabs which are substantially flat and suitable for being straightened above its upper face,
b) partially straightening the tabs toward the accommodation zones,
c) positioning the heat pipes and/or the inserts in each accommodation zone between the tabs and in contact with the upper face of the bottom plate,
d) terminating the straightening of the tabs so that they are pressed against the side faces of the heat pipes and/or inserts,
e) depositing a selected thickness of a (first) adhesive against the side faces of the heat pipes and/or the inserts,
f) positioning separating structures, substantially having the same height as that of the heat pipes and/or the inserts on either side of the side faces of each heat pipe and/or insert and in contact with the upper face of the bottom plate,
g) placing an upper plate above the heat pipes and/or inserts and the separating structures and in contact therewith.

The method according to the invention may comprise other features which may be considered separately or in combination, and in particular:

- in step c) the bottom plate may be placed on a plate (or baking plate) having a selected planeity, before positioning the heat pipes and/or inserts;
- in step b), the upper face of the bottom plate may be coated with a layer of a (second) adhesive, before or after having partially straightened the tabs;
- in step g), before placing the upper plate, its lower face (intended to be in contact with the heat pipes and/or inserts and separating structures) may be coated with a layer of the (second) adhesive;
- in step b), the tabs may be partially straightened so that they make an angle, selected in an interval of between 15° and about 45° with the upper face of the bottom plate. For example, an angle of about 30° may be selected;
- the tabs may be defined in the bottom plate by means of a technique selected from machining, laser cutting, fluid jet cutting, and stamping;
- as an alternative, the tabs may be added on to the upper face of the bottom plate;
- in step c), an edge frame may be placed on the plate (or baking plate), and the bottom plate then placed in the edge frame;
- after step g), it may comprise a step h) consisting in passing the assembled panel through a furnace or an autoclave;
- after step h), it may comprise a step i) consisting in stripping the assembled panel in order to separate it from the baking plate;
- separating structures of the honeycomb type may be used;
- a (first) intumescent type of adhesive may be used.

The invention also proposes a panel having built-in heat pipe(s) and/or insert(s) prepared using a fabrication method of the type presented above.

The invention is particularly, although not exclusively, appropriate for panels having built-in heat pipe(s) and/or insert(s) intended to be installed on spacecraft, such as satellites for example. However, it also relates to other fields of application, such as the aeronautic or automotive field for example, insofar as a heat pipe or an insert must be integrated in a panel (or "metal sandwich").

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The appended drawings may not only serve to complete the invention, but also contribute to its definition, if necessary. It is important to note that in FIGS. 1 to 7, the respective dimensions of the various elements are not representative of their actual and relative dimensions.

It is the object of the invention to allow the simplified fabrication of panels having built-in heat pipe(s) and/or insert(s), through the non-use of immobilization pins.

In the following discussion, it is considered as a nonlimiting example that the panels have built-in heat pipes and are intended to be installed on spacecraft, such as satellites for example. However, such panels may comprise only inserts (instead of heat pipes) or a mixture of heat pipe(s) and insert(s). Moreover, these panels may be installed on other equipment or systems, particularly in the aeronautic and automotive fields, insofar as a heat pipe or an insert must be integrated in a panel. Such panels may have any size, and for example 6 m×5 m (the size limit depends on the dimensions of the autoclave curing means, for example).

In order to implement a method according to the invention, it is first necessary to provide in a first step (a) at least one bottom plate SI, for example made from aluminum, an upper plate SS, for example made from aluminum, heat pipes Ci (and/or inserts), generally having a linear shape (but optionally having any other geometric shape, such as L, U, V or S for example), and separating structures Nj, for example of the honeycomb type made from aluminum, having a height substantially equal to that of the heat pipes Ci. It is also preferable to provide a flat plate (generally called baking plate) MC, having a selected planeity (typically of about 0.1 mm per 100 mm, with 2 mm of overall planeity).

In the following discussion, the words bottom and upper systematically indicate a position with regard to the baking plate (MC), that is to say orientations respectively toward the (upper) face of the support of the baking plate (MC) and identical to this (upper) face of the support (and therefore opposite it).

Figure 1:
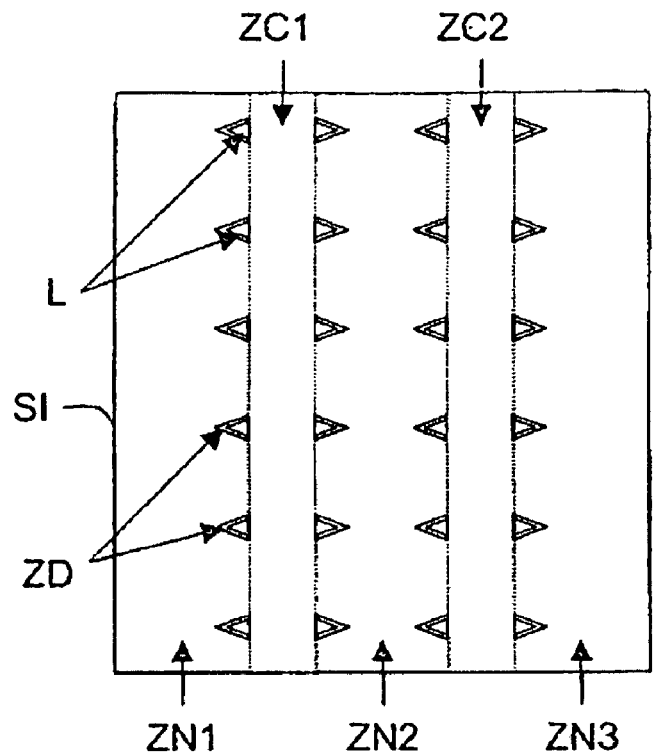
FIG. 1 schematically shows the upper face of a bottom plate of a panel with built-in heat pipes, FIG. 2 schematically shows a cross section of the bottom plate in FIG. 1 after partial straightening of the tabs, FIG. 3 schematically shows a cross section of the bottom plate in FIG. 2, after positioning on a baking plate and after placing the heat pipes in their accommodation zones, FIG. 4 schematically shows a cross section of the bottom plate in FIG. 2, after positioning on a baking plate, and placement of the heat pipes in their accommodation zones and after complete straightening of the tabs, FIG. 5 schematically shows a cross section of the bottom plate in FIG. 2, after positioning on a baking plate, placement of the heat pipes in their accommodation zones, complete straightening of the tabs and placement of the intumescent adhesive against the side faces of the heat pipes, FIG. 6 schematically shows a cross section of the bottom plate in FIG. 2, after positioning on a baking plate, placement of the heat pipes in their accommodation zones, complete straightening of the tabs, placement of the intumescent adhesive against the side faces of the heat pipes and placement of the separating structures, FIG. 7 schematically shows a cross section of the bottom plate in FIG. 2, after positioning on a baking plate, placement of the heat pipes in their accommodation zones, complete straightening of the tabs, placement of the intumescent adhesive against the side faces of the heat pipes, placement of the separating structures and placement of the upper plate.

According to the invention, and as shown in FIG. 1, the bottom plate SI comprises tabs L, substantially flat, initially substantially parallel to its upper face and being straightenable above the latter.

In the context of the present invention, "tab" means any element (or bracket or stud) joined to the bottom plate SI and being rotatable about 90° with respect to the upper surface of said bottom plate SI.

These tabs may be fabricated by any means known to a person skilled in the art. For example, and as shown in FIG. 1, they may be defined in the bottom plate SI by machining, laser cutting or fluid jet cutting, or even stamping. For example, in the case of machining, they can be prepared with a 5/10 mm diameter milling cutter. In this case, the tabs L are initially placed in cut-out zones ZD of the bottom plate SI.

In an alternative, the tabs L may be added on to the upper face of the bottom plate SI. In this case, they are fabricated separately, and then joined at places selected on the upper face of the bottom plate SI, for example by welding or bonding.

In the schematic example shown in FIG. 1, the tabs L have a substantially triangular (or V) shape. However, this is not mandatory. Any shape which, when straightened, can block (or wedge) part of a side face of the heat pipe C may be considered, and particularly a half-round or a crescent shape.

These tabs L are defined at selected locations of the bottom slab SI, located on either side of these accommodation zones ZCi in which the heat pipes Ci must be installed. To some extent, the tabs L are placed along alignments which bound the side edges of the heat pipe accommodation zones ZCi. The zones ZNj, of the upper surface of the bottom plate SI, which are placed on either side of the heat pipe accommodation zones ZCi are intended to accommodate separating (or/honeycomb) structures Nj. In the schematic and nonlimiting example shown in FIGS. 1 to 7, the bottom plate SI comprises two heat pipe accommodation zones ZC1 and ZC2 (i=1 and 2) and three separating structure reception zones ZN1 to ZN3 (j=1 to 3). However, the numbers of heat pipe accommodation zones ZCi and the separating structure reception zones ZNj may be much larger than 2 as required, for example 30 or 40, or even 60.

The number of tabs L framing each heat pipe accommodation zone ZCi varies according to the dimensions and the geometry (or shape) of the heat pipes. For example, 6 or 8 may be provided, or even more, for each heat pipe Ci.

Once the tabs L are defined, the bottom plate SI, at least, can be subjected to a treatment intended to promote the bonding of the adhesive.

Figure 2:
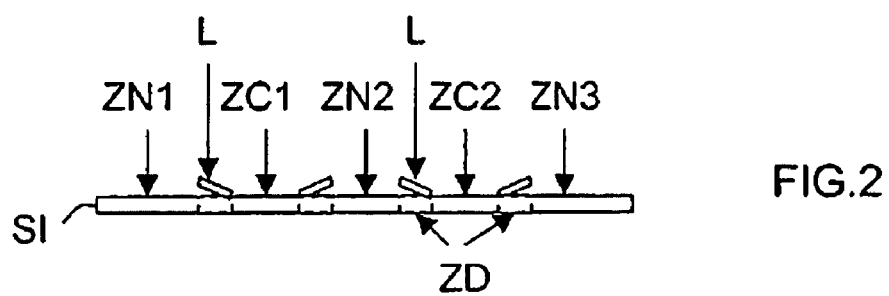

In a second step (b), shown in FIG. 2, the tabs L of the bottom plate SI are partially straightened toward the heat pipe accommodation zones ZCi.

This partial straightening is intended to allow the positioning of the heat pipes Ci in their accommodation zones ZCi. It consists in slightly rotating all the tabs L so that they make a selected angle to the upper face of the bottom plate SI. When the tabs L are not added on, they are therefore separated from their cutout zones ZD.

The angle of rotation is between about 15° and about 45° for example. For example, an angle of rotation of about 30° can be selected, as shown schematically in FIG. 2.

In this second step (b), the upper face of the bottom plate SI may optionally be coated with a layer of (second) adhesive CE2, before or after the tabs have been partially straightened. The layer of adhesive CE2 is for example deposited on the upper face in the form of a thin film, typically 100 to 150 grams per m$^2$, or a thickness of about 0.1 mm. This adhesive CE2 is of the redux 312 type for example.

Figure 3:
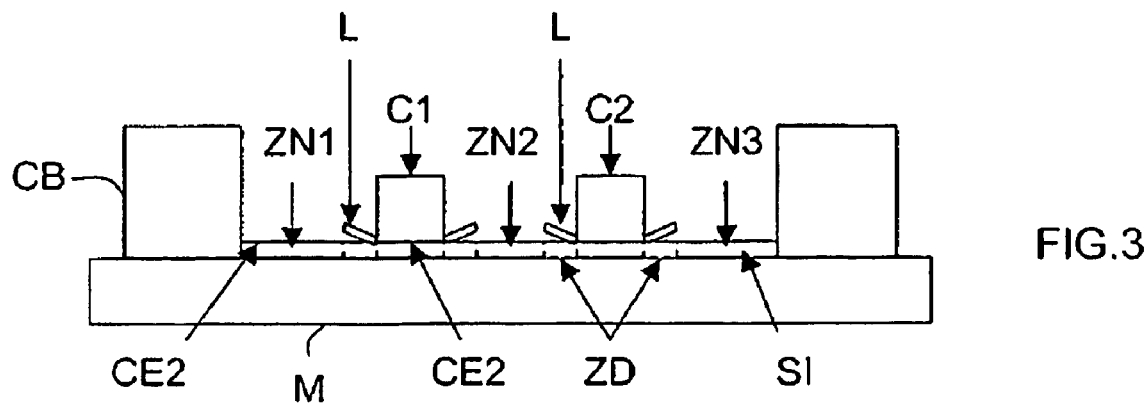
Figure 4:
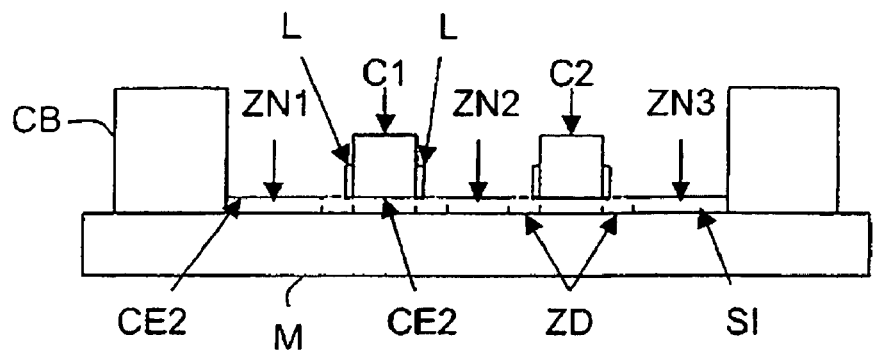

In a third step (c), schematically shown in FIG. 3, the heat pipes Ci are positioned in their respective accommodation zones ZCi, that is between the pairs of alignments of tabs L which bound the accommodation zones ZCi. This positioning is intended to place the lower face of the heat pipes Ci in contact with the upper face of the bottom plate SI, in order to immobilize them thereon due to the layer of (second) adhesive CE2.

To reinforce the bonding of the heat pipes Ci to the upper face of the bottom plate SI, the heat pipes Ci may also be coated with a layer of (second) adhesive CE2 before being positioned in their accommodation zones ZCi.

Furthermore, and as shown in FIG. 3, to facilitate the fabrication of the panel P, the bottom plate SI may be placed on the flat plate (or baking plate) MC before the heat pipes Ci are positioned in their accommodation zones ZCi. In this case, the lower face of the bottom plate SI rests on the upper face of the baking plate MC.

The fabrication of the panel P may be even further facilitated by the positioning of the bottom plate SI inside an edge frame CB placed on the upper face of the baking plate MC.

In a fourth step (d), schematically shown in FIG. 4, the tabs L are again straightened so as to be pressed against the side faces of the heat pipes Ci. On completion of this final straightening, the angle of rotation between the tabs L and the upper face of the bottom plate SI is then substantially equal to 90°. The heat pipes Ci are then perfectly positioned and immobilized in their respective accommodation zones ZCi.

Figure 5:
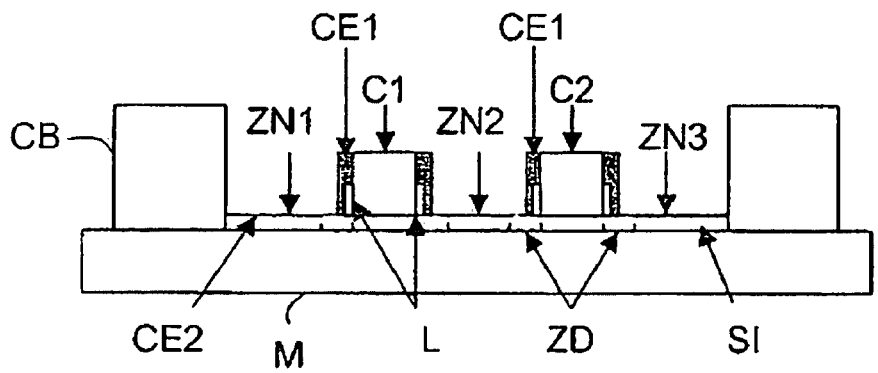

In a fifth step (e), schematically shown in FIG. 5, a layer of a (first) adhesive CE1 is deposited against the side faces of the heat pipes Ci and therefore also against the completely straightened tabs L. This layer of (first) adhesive CE1 has a selected thickness. For example, a thickness of about 2 mm can be selected (but it may also be thinner or thicker according to the type of (first) adhesive CE1 used).

This (first) adhesive CE1 is preferably of the intumescent type, that is it is converted into an adhesive foam and is suitable for filling all the cavities formed by the honeycomb Nj opposite the side faces of the heat pipes Ci. For example, a redux 206-type adhesive CE1 may be used.

Figure 6:
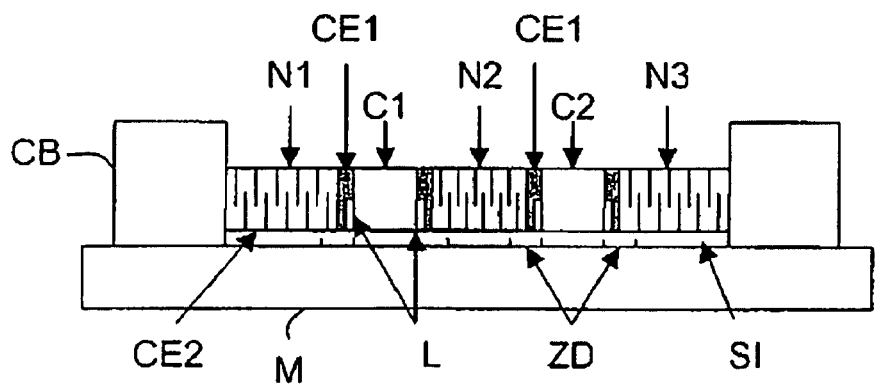

In a sixth step (f), schematically shown in FIG. 6, the separating (or honeycomb) structures Nj are positioned in their respective reception zones ZNj, that is on either side of the side faces of the heat pipes Ci.

This positioning is intended to place the lower face of the separating structures Nj in contact with the upper face of the bottom plate SI to secure their immobilization there on by the layer of (second) adhesive with which it is coated.

In order to reinforce the bonding of the separating structures Nj to the upper face of the bottom plate SI, the separating structures Nj may optionally be coated with a layer of (second) adhesive before being positioned in their reception zones ZNj.

It is important to note that the fifth (e) and sixth (f) steps may be reversed. In this case, the separating structures Nj are first positioned in their respective reception zones ZNj, and the layer of (first) adhesive CE1 is then positioned between the side faces of the heat pipes Ci and the separating structures Nj facing them.

Figure 7:
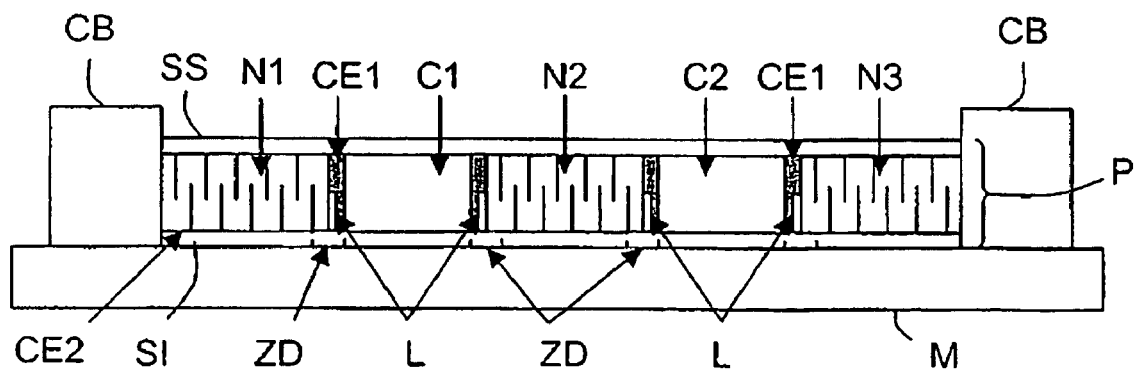

In a seventh step (g), schematically shown in FIG. 7, the upper plate SS is placed above the upper faces of the heat pipes Ci and the separating structures Nj so that its lower face is in contact with said upper faces.

To reinforce the immobilization of the upper plate SS with regard to the heat pipes Ci and separating structures Nj, its lower face is coated with a layer of (second) adhesive before it is positioned.

At this stage, the various elements (Sl, Ci, L, Nj and SS) constituting a panel P are henceforth assembled.

The method may be continued by an eighth step (h), in which the panel with built-in heat pipes, preferably placed on the baking plate MC, is introduced into a furnace or an autoclave for a selected period and under a selected pressure. This residence in the furnace is intended to cause the curing of the first and second adhesives (when they are selected for this purpose) and hence the final joining together of the various elements (Sl, Ci, L, Nj and SS) of the assembled panel P.

In this case, the method is completed by a ninth step (i) of stripping, intended to separate the assembled panel P from the baking plate MC.

The method according to the invention offers a certain number of advantages over methods of the prior art, and in particular:

elimination of the use of pins and hence of the initial treatment with stripping agent and the final cleaning thereof, and also the economy of fabrication thereof, elimination of the drillings in the upper plates, and in the baking plate, for the passage of the pins, elimination of the drillings of the products called environmental (such as for example teflon-treated fiberglass fabric) used to provide an anti-adhesive power, elimination of the pin extraction steps, which are very problematic, automatic and very accurate positioning of the heat pipes and/or the inserts and the separating structures, absence of reservation of zones for applying the (first) intumescent adhesive, use of a plate requiring a single curing regardless of the type of panel, a single curing step instead of 2, no risk of impossibility of stripping.

The invention is not limited to the embodiments of the fabrication method and the panels having built-in heat pipe(s) and/or insert(s) described above, exclusively as an example, but it encompasses all alternatives that a person skilled in the art may consider within the framework of the claims below.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for fabricating panel(s) having built-in heat pipe(s) and/or insert(s), comprising:
   a) providing a bottom plate having, in selected places on either side of the heat pipe or insert accommodation zones, tabs which are substantially flat and suitable for being straightened above an upper face of the bottom plate,
   b) partially straightening said tabs toward said accommodation zones,
   c) positioning said heat pipes and/or said inserts in each accommodation zone between said tabs and in contact with said upper face of the bottom plate,
   d) terminating the straightening of said tabs so that said tabs are pressed against side faces of said heat pipes and/or said inserts,
   e) depositing a selected thickness of a first adhesive against said side faces of the heat pipes and/or the inserts,
   f) positioning separating structures, substantially having a same height as that of said heat pipes and/or said inserts on either side of the side faces of each heat pipe and/or insert and in contact with said upper face of the bottom plate, and
   g) placing a plate called upper plate above said heat pipes and/or inserts and said separating structures and in contact therewith.

2. The method as claimed in claim 1, wherein step b), said upper face of the bottom plate is coated with a layer of a second adhesive, before having partially straightened said tabs.

3. The method as claimed in claim 1, wherein said tabs are defined in said bottom plate by a technique selected from a group comprising at least machining, laser cutting, fluid jet cutting and stamping.

4. The method as claimed in claim 1, wherein said tabs are added onto the upper face of said bottom plate.

5. The method as claimed in claim 1, wherein separating structures of a honeycomb type are used.

6. The method as claimed in claim 1, wherein the first adhesive is an intumescent type.

7. The method as claimed in claim 1, wherein step b), said upper face of the bottom plate is coated with a layer of a second adhesive, after having partially straightened said tabs.

8. The method as claimed in claim 7, wherein step g), before placing said upper plate, a lower face of said upper plate which is intended to be in contact with said heat pipes and/or inserts and said separating structures, is coated with a layer of said second adhesive.

9. The method as claimed in claim 1, wherein step b), said tabs are partially straightened to make an angle, selected to be between 15° and 45°, with the upper face of the bottom plate.

10. The method as claimed in claim 9, wherein said angle is selected to be substantially equal to 30°.

11. The method as claimed in claim 1, wherein step c), before positioning the heat pipes and/or inserts, said bottom plate is placed on a third plate having a selected planeity.

12. The method as claimed in claim 11, wherein step b), said upper face of the bottom plate is coated with a layer of a second adhesive, after having partially straightened said tabs.

13. The method as claimed in claim 11, wherein step b), said upper face of the bottom plate is coated with a layer of a second adhesive, before having partially straightened said tabs.

14. The method as claimed in claim 11, wherein step b), said tabs are partially straightened to make an angle, selected to be between 15° and 45°, with the upper face of the bottom plate.

15. The method as claimed in claim 11, wherein said tabs are defined in said bottom plate by a technique selected from a group comprising at least machining, laser cutting, fluid jet cutting and stamping.

16. The method as claimed in claim 11, wherein step c), an edge frame is placed on said third plate having a selected planeity, and said bottom plate is then placed in said edge frame.

17. The method as claimed in claim 16, comprising a step h), after step g), in which each assembled panel is passed through a furnace or an autoclave.

18. The method as claimed in claim 17, comprising a step i), after step h), in which each assembled panel is stripped in order to separate the assembled panel from said third plate having a selected planeity.

* * * * *